(12) United States Patent
Aihara

(10) Patent No.: US 11,051,652 B1
(45) Date of Patent: Jul. 6, 2021

(54) AUTOMATIC ROTATING GRILL MACHINE

(71) Applicant: STRIVE L.L.C., Tokyo (JP)

(72) Inventor: Yukihiro Aihara, Tokyo (JP)

(73) Assignee: STRIVE L.L.C., Tokyo (JP)

(*) Notice: Subject to any disclaimer, the term of this patent is extended or adjusted under 35 U.S.C. 154(b) by 0 days.

(21) Appl. No.: 17/107,354

(22) Filed: Nov. 30, 2020

(30) Foreign Application Priority Data

Dec. 20, 2019 (JP) .............................. JP2019-230767

(51) Int. Cl.
*A47J 37/04* (2006.01)

(52) U.S. Cl.
CPC ............. *A47J 37/041* (2013.01); *A47J 37/04* (2013.01); *A47J 37/048* (2013.01)

(58) Field of Classification Search
CPC ......... A47J 37/04; A47J 37/041; A47J 37/042
USPC ............. 99/421 H, 421 HH, 421 HV, 421 M, 99/421 P, 421 R
See application file for complete search history.

(56) References Cited

U.S. PATENT DOCUMENTS

| | | | | |
|---|---|---|---|---|
| 2,198,134 A | * | 4/1940 | Spiegl ................. | A47J 37/041 99/393 |
| 2,576,028 A | * | 11/1951 | Mitchell .............. | A47J 37/041 99/397 |
| 3,943,837 A | * | 3/1976 | Trkla ................... | A47J 37/0704 99/339 |
| 5,113,699 A | * | 5/1992 | Soriano ............... | A47J 37/0745 126/25 R |
| 6,058,925 A | * | 5/2000 | Patterson ............ | A47J 37/0694 126/25 A |
| 2007/0077338 A1 | | 4/2007 | Calzada et al. | |

FOREIGN PATENT DOCUMENTS

| | | |
|---|---|---|
| JP | S3311882 Y | 8/1958 |
| JP | S373382 Y | 2/1962 |
| JP | S4738551 Y1 | 11/1972 |
| JP | S6411149 U | 1/1989 |
| JP | H10323286 A | 12/1998 |
| JP | 2004248930 A | 9/2004 |
| JP | 2009509714 A | 3/2009 |
| JP | 2011167296 A | 9/2011 |

OTHER PUBLICATIONS

Office Action issued in JP 2019-230767; mailed by the Japanese Patent Office dated Mar. 4, 2020.

* cited by examiner

*Primary Examiner* — Reginald Alexander
(74) *Attorney, Agent, or Firm* — Studebaker & Brackett PC

(57) ABSTRACT

Provided is an automatic rotating grill machine which can be used at home or elsewhere so that an ordinary user can enjoy new pleasure and leisure time. An automatic rotating grill machine is a machine that cooks a food item that is a cooking target, by heating while rotating the food item held on a rotating skewer member. The automatic rotating grill machine includes a housing, a wheel attached to the housing, a heating portion including a heating source provided in the housing or a heating source placement tool on which the heating source is to be placed, a driving device which rotates the rotating skewer member in a given position where the food item can be heated by the heating portion, and a driving control device configured to supply power to a driving source for the driving device and to control driving.

8 Claims, 9 Drawing Sheets

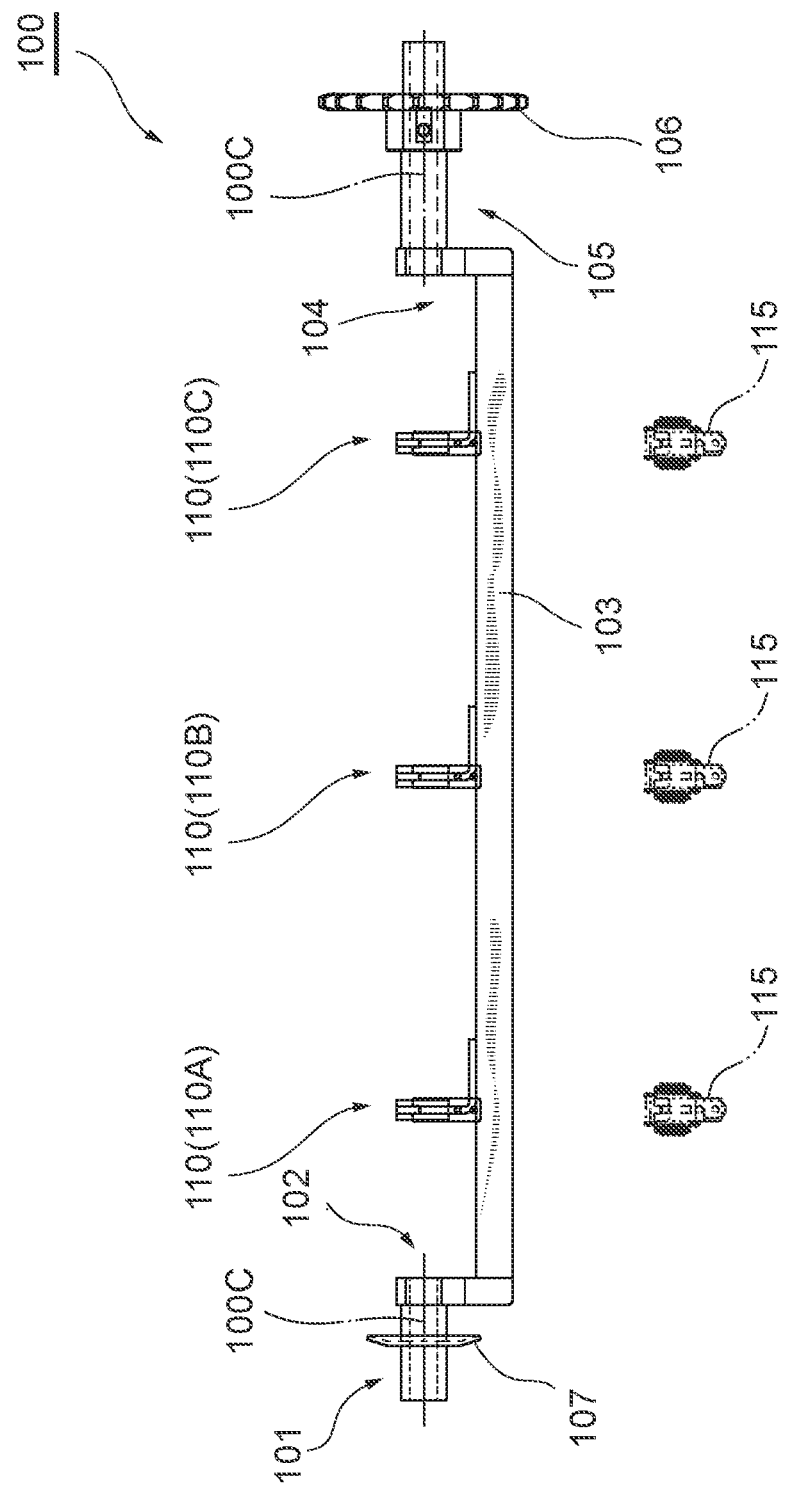

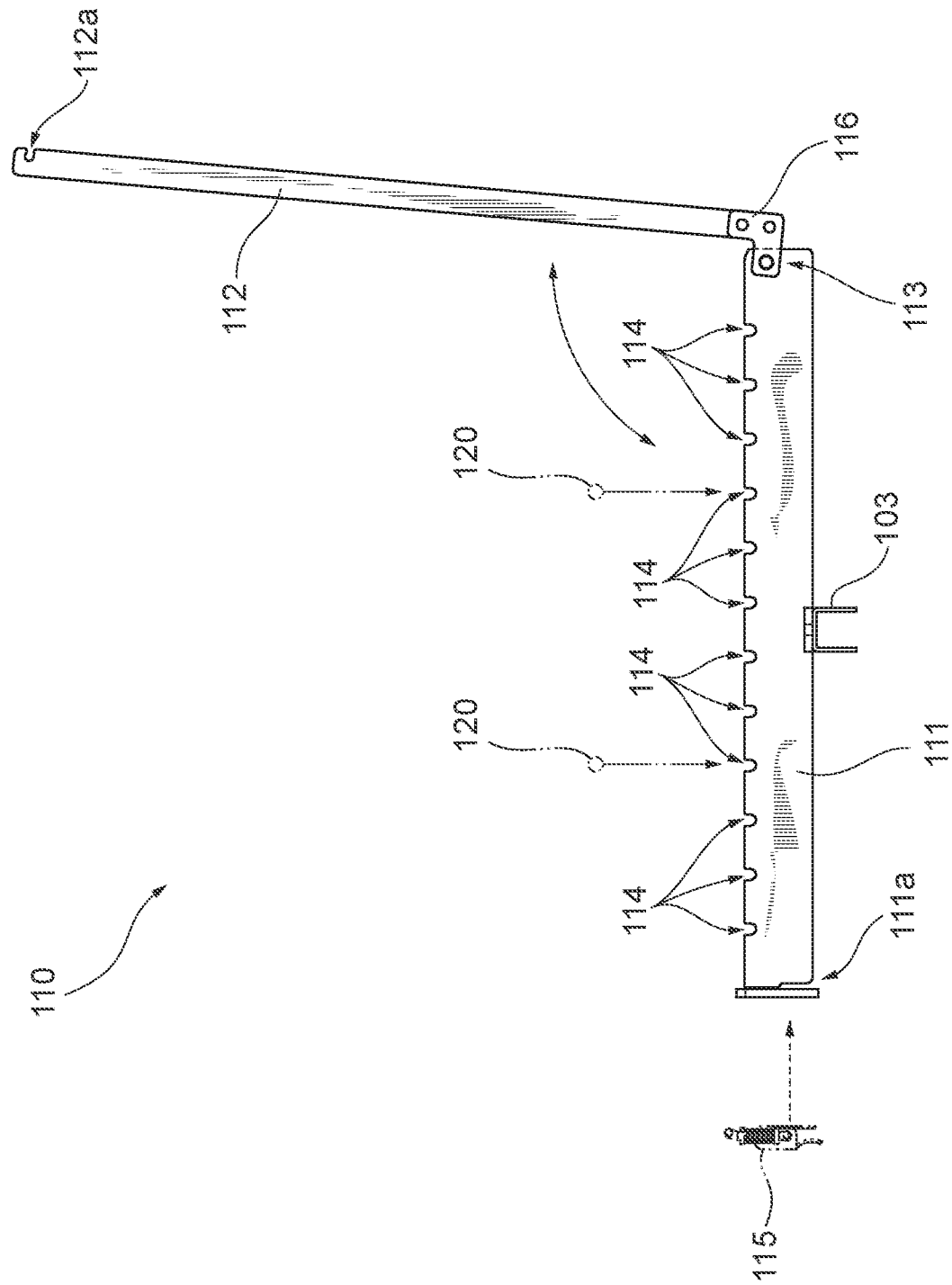

AUTOMATIC ROTATING GRILL MACHINE

CROSS-REFERENCES TO RELATED APPLICATIONS

This application relates to and claims priority from Japanese Patent Application No. JP 2019-230767, filed on Dec. 20, 2019, the entire disclosure of which is incorporated herein by reference.

BACKGROUND

Field

The present disclosure relates to an automatic rotating grill machine.

Description of Related Art

There have been proposed cooking machines for grilling for example chicken meat arranged on skewers by automatically rotating the chicken meat (see for example Publication of Patent Application: JP2004-248930A). Such cooking machines are utilized as grill machines for vehicles equipped with cooking facilities such as food cars and food trucks as well as at restaurant kitchens.

SUMMARY

However, the conventional rotating grill machines have been developed for commercial use and have not been developed in consideration of, for example, how casually ordinary users use the machines. Automatic rotating grill machines which can be used casually at home or elsewhere can get a reasonable amount of demand and can provide new pleasure and leisure time which have never been experienced by ordinary users.

It is therefore an object of the present disclosure to provide an automatic rotating grill machine which can be easily used at home or elsewhere so that an ordinary user can enjoy new pleasure and leisure time.

An automatic rotating grill machine according to one aspect of the present disclosure is a machine for cooking a food item that is a cooking target held on a rotating skewer member, by heating while rotating the food item, the machine including a housing; a wheel attached to the housing; a heating portion including a heating source provided in the housing or a heating source placement tool on which the heating source is to be placed; a driving device which rotates the rotating skewer member in a given cooking position where the food item is capable of being heated by the heating portion; and a driving control device configured to supply power to a driving source for the driving device and to control driving.

The automatic rotating grill machine having the housing equipped with the wheel is highly mobile, which allows the machine to be easily adapted to small-scale, more personal applications. The machine can provide a new type of leisure time which is casual and yet wilder than before such as enjoying food and conversation while grill-cooking at home (not only indoors but also at a balcony and a garden area) as well as in a nearby barbecue place or on the beach.

In the automatic rotating grill machine, the housing may be provided with a bearing member including an open groove which allows the rotating skewer member to be attached to and detached from the cooking position.

In the automatic rotating grill machine, the driving device may include a driving force transmission mechanism which is driven by the driving source, and the rotating skewer member may include a driving target mechanism which engages with the driving force transmission mechanism in the cooking position.

In the automatic rotating grill machine, the rotating skewer member may include a gripping portion which is available to a user when the rotating skewer member is attached to or detached from the cooking position.

In the automatic rotating grill machine, the rotating skewer member may include a skewer holding member which holds a cooking skewer.

In the automatic rotating grill machine, the skewer holding member may be configured to extend radially from a support shaft of the rotating skewer member.

In the automatic rotating grill machine the skewer holding member may include a skewer placement portion which is capable of being mounted with the cooking skewer and a skewer pressing portion which presses the cooking skewer mounted on the skewer placement portion and hold the cooking skewer together with the skewer placement portion.

In the automatic rotating grill machine, one or both of the skewer placement portion and the skewer pressing portion may have a skewer groove for positioning the cooking skewer.

In the automatic rotating grill machine, one or both of the skewer placement portion and the skewer pressing portion may have a plurality of the skewer grooves in a plurality of locations.

In the automatic rotating grill machine, a plurality of the skewer holding members may be provided along an axial direction of the rotation axis of the rotating skewer member, and the skewer grooves may be provided in positions of the plurality of skewer holding members equidistant from the rotation axis.

In the automatic rotating grill machine, the skewer pressing portion may be pin-connected to a connection point of the skewer placement portion and is capable of being opened and closed around the connection point.

In the automatic rotating grill machine, the skewer holding member may further include a locking device which keeps the skewer placement portion and the skewer pressing portion holding the cooking skewer.

In the automatic rotating grill machine, the skewer holding member may be arranged axisymmetrically with respect to the rotation axis or plane-symmetrically with respect to a plane including the rotation axis.

In the automatic rotating grill machine, the support shaft for the rotating skewer member which supports the skewer holding member may be arranged in a position offset from the rotation center of the rotating skewer member.

In the automatic rotating grill machine, wheels having different sizes in the advancing direction of the automatic rotating grill machine are attached as the wheel.

The automatic rotating grill machine may further include a handle attached to the housing.

According to the present disclosure, an automatic rotating grill machine which can be easily used at home or elsewhere so that an ordinary user can enjoy new pleasure and leisure time can be provided.

BRIEF DESCRIPTION OF THE DRAWINGS

FIG. 10 is a right side view of the rotating skewer member; and

FIG. 11 is a view of an exemplary structure of a skewer holding member.

DETAILED DESCRIPTION

Figure 1:
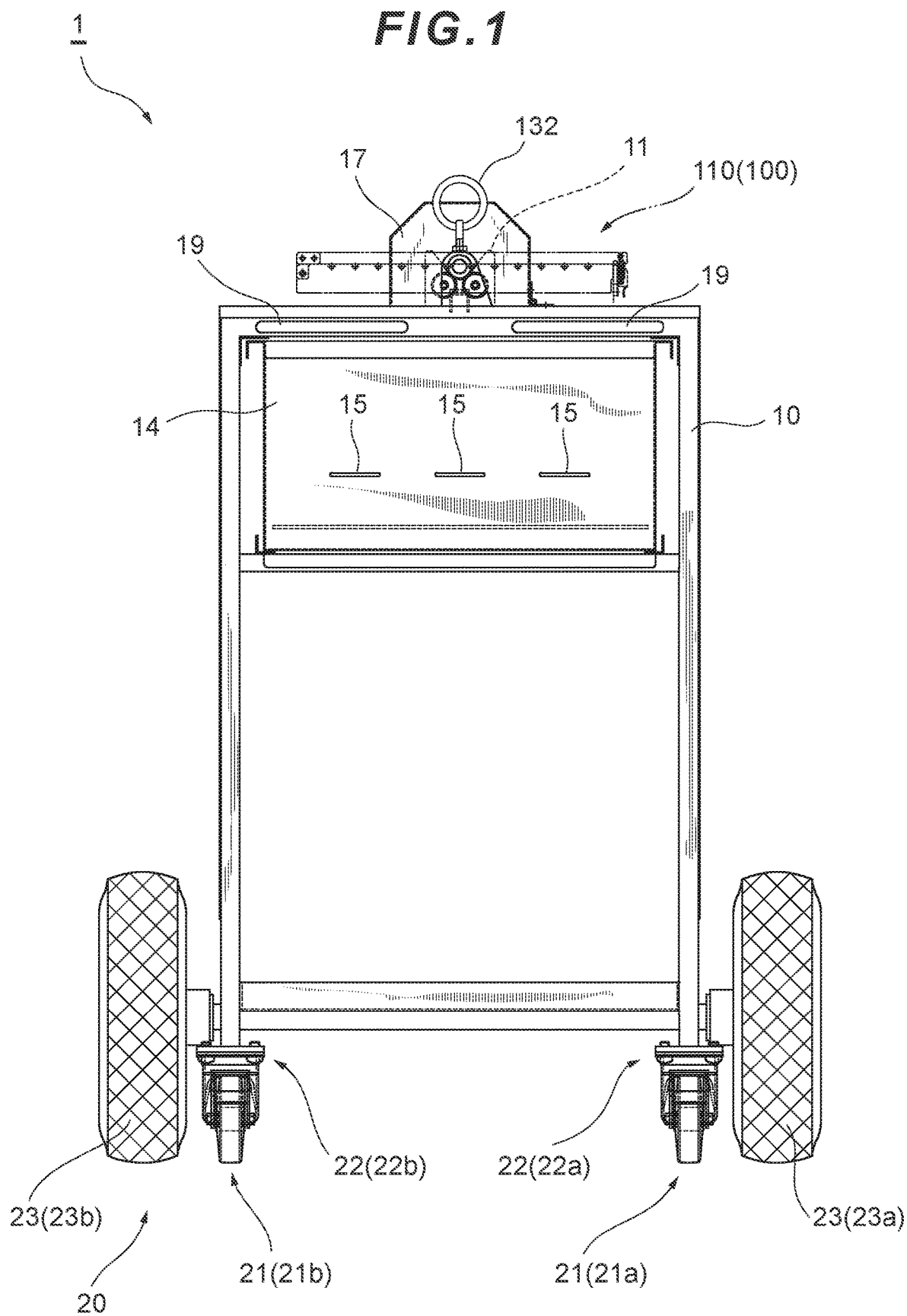
FIG. 1 is a front view of an automatic rotating grill machine according to an embodiment of the present disclosure.
Figure 2:
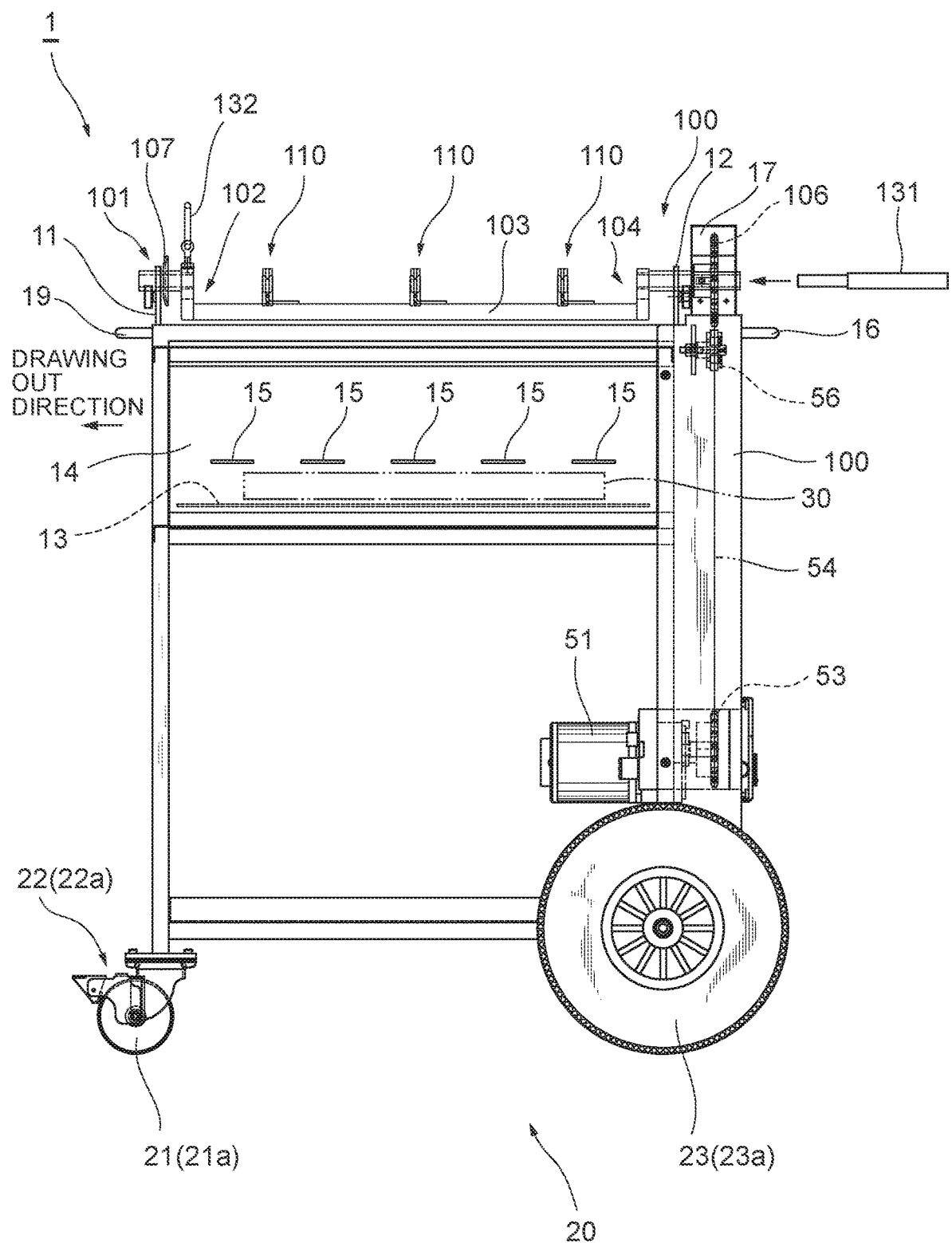
FIG. 2 is a right side view of the automatic rotating grill machine.

Hereinafter, the present disclosure will be described in detail with reference to an exemplary embodiment shown in the drawings.

A rotating skewer grill machine (automatic rotating grill machine) 1 is a machine which holds various food items such as chicken meat on a rotating skewer member 100 and cooks the food items by heating while automatically rotating the items. The rotating skewer grill machine 1 according to the embodiment includes a housing 10, wheels 20, a heating portion 30, a driving device 50, a driving control device 60, and the rotating skewer member 100 (see FIGS. 1 to 11).

The housing 10 is made of for example a metal frame and an exterior and has the heating portion 30, the driving device 50, and the driving control device 60 therein. Although the housing 10 according to the embodiment is formed to have a rectangular parallelepiped shape (see FIGS. 1 to 4), the outer shape and size are not particularly limited. The housing 10 according to the embodiment further includes a front bearing member 11, a rear bearing member 12, a charcoal grate 13, air holes 15, handles 16, a sprocket cover 17, a chain cover 18, and handles 19 (see for example FIG. 2).

The wheels 20 are provided, for example, at the four corners of the housing 10 to facilitate movement of the housing 10. As an example, the wheels 20 in the rotating skewer grill machine 1 according to the embodiment include a pair of rotatable casters 21a and 21b provided on the right and left sides of the front side of the housing 10 and a pair of tires 23a and 23b provided on the right and left sides of the rear side of the housing 10, and the wheels differ in size in the advancing direction of the rotating skewer grill machine 1 (see for example FIG. 2). Stoppers 22 (22a and 22b) are provided to the casters 21a and 21b (see for example FIG. 3). As the tires 23a and 23b, large-diameter non-puncture tires (made of rubber or urethane foam), which are easy to handle and not likely to sink in beach sand, may be used (see for example FIG. 3). The handles 16 are provided on the rear side of the housing 10 and the handles 19 are provided on the front side (see for example FIG. 4).

The bearing member rotatably supports the rotating skewer member 100 in a given position. The bearing member according to the embodiment includes the front bearing member 11 provided on the upper part of the housing 10 on the front side and the rear bearing member 12 which can be mounted on the upper part of the housing 10 on the rear side for example with bolts 12d (see for example FIG. 2). The front and rear bearing members 11 and 12 are provided with open grooves 11c and 12c which allow the rotating skewer member 100 (shaft parts 101 and 105 thereof) to be attached/detached (see for example FIGS. 5 to 8). When, for example, the open groove 11c has a V shape which has a wider opening at the top like the front bearing member 11 according to the embodiment, the rotating skewer member 100 is easily set and installed in the housing 10, as the shaft portion 101 is easily guided into a prescribed position (see FIG. 6). According to the embodiment, a pair of bearing rollers 11a and 11b and a pair of bearing rollers 12a and 12b are provided at the front bearing member 11 and the rear bearing member 12, respectively to reduce friction when the rotating skewer member 100 rotates (see for example FIGS. 5 to 8).

The charcoal grate (heating source placement tool) 13 is a member made of an expanded metal grate for charcoal on which charcoal as a heating source is placed. According to the embodiment, the housing 10 is provided with a charcoal drawer 14, and the bottom of the charcoal drawer 14 serves as the charcoal grate 13, so that charcoal is easily supplied/removed (see for example FIG. 2). For example, the charcoal drawer 14 may be drawn forward. The wall surface of the charcoal drawer 14 has the air holes 15 (see FIG. 2)

The sprocket cover 17 is a member which covers a sprocket 106. According to the embodiment, the box-shaped sprocket cover 17 attached detachably to the housing 10 (or the chain cover 18 attached to the housing 10) (see for example FIGS. 3 and 4) is used. In order to remove the rotating skewer member 100 from the housing 10, the sprocket cover 17 must be removed beforehand. The sprocket cover 17 attached after setting the rotating skewer member 100 to the housing 10, the sprocket 106 driven to rotate and the surrounding area are covered (see for example FIG. 3).

The chain cover 18 is a member which covers a movable part such as a chain 54. According to the embodiment, the chain cover is detachably attached to the housing 10 to cover the chain 54, an idler 55 and a tension adjusting idler 56 which rotate with the chain 54, and the drive gear 53 of the drive motor 51 so that the user or anyone cannot touch these elements (see for example FIG. 4). A circuit protector 62, a speed control regulator 63, a power receiving lamp 64, and a start switch 65 as components of the driving control device 60 are provided at one surface of the chain cover 18 (on the rear side of the rotating skewer grill machine 1).

The heating portion 30 serves as a heat source for cooking food items. According to the embodiment, as described above, the charcoal placed on the charcoal grate 13 serves as a heating source and constitutes the heating portion 30 (see for example FIG. 2).

The driving device 50 is a device for automatically rotating the rotating skewer member 100 in a given cooking position. For example, the driving device 50 in the rotating skewer grill machine 1 according to the embodiment includes the drive motor (drive source) 51, a driving force transmission mechanism 52, the drive gear 53, the chain 54, the idler 55, and the tension adjusting idler 56 (see for example FIG. 3).

The drive motor 51 is a drive source provided near the bottom of the housing 10. Driving force from the drive motor 51 is transmitted to the rotating skewer member 100 by the chain 54 as a part of the driving force transmission mechanism 52. The chain 54 is wound around the drive gear 53 of the drive motor 51, and the idler 55 and the tension adjusting idler 56 provided in housing 10 (see for example FIG. 3).

Figure 3:
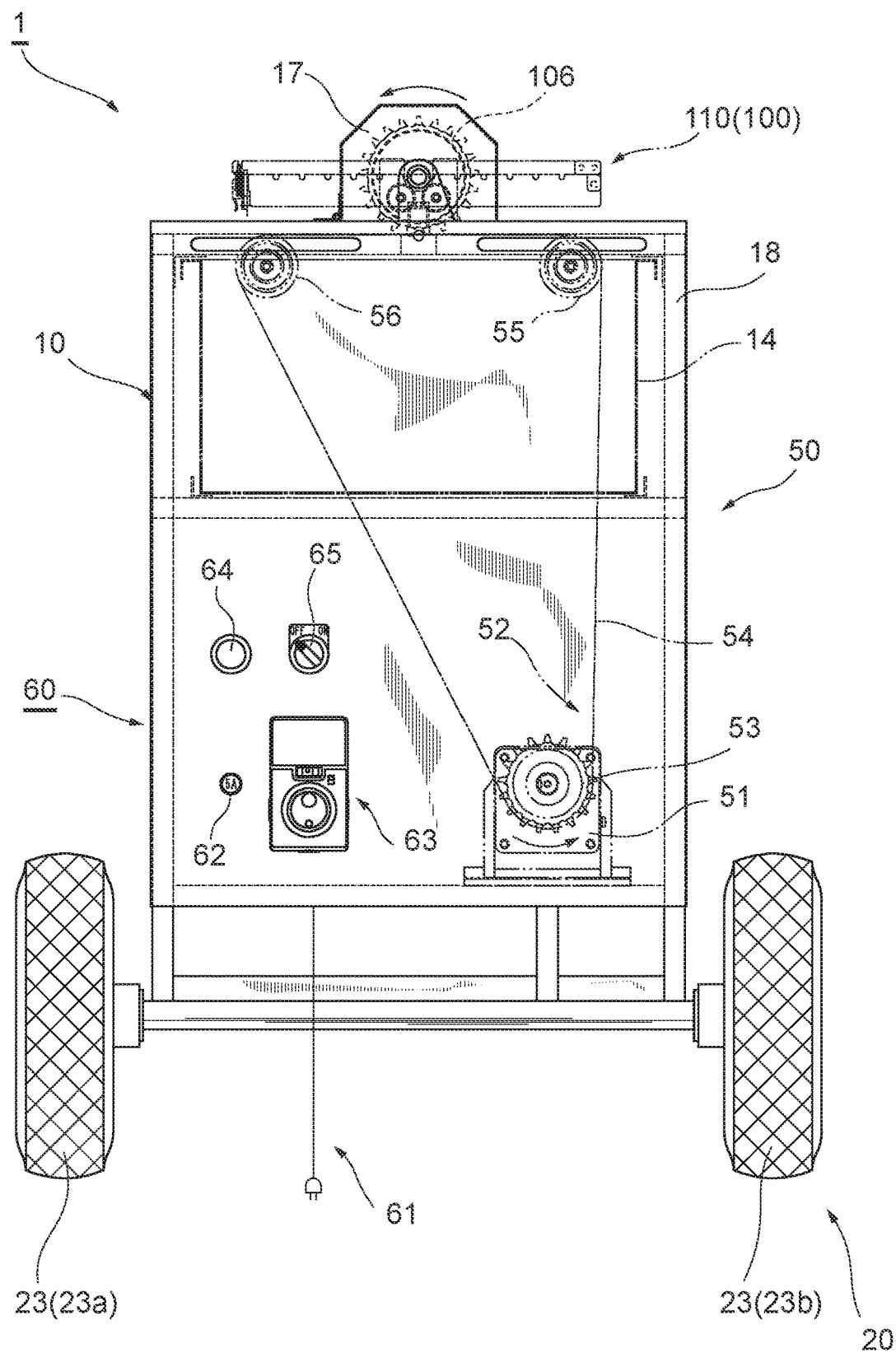
FIG. 3 is a rear view of the automatic rotating grill machine.

The driving control device 60 includes a power supply cord 61, the circuit protector 62, the speed control regulator 63, the power receiving lamp 64, and the start switch 65 (see for example FIG. 3). Using the motor controller as the speed control regulator 63, the rotation speed of the drive motor 51 and the rotation speed of the rotating skewer member 100 can be controlled and freely set by the user. The start switch 65 is designed to be easy to use for anyone. (The switch is turned on/off.)

Figure 4:
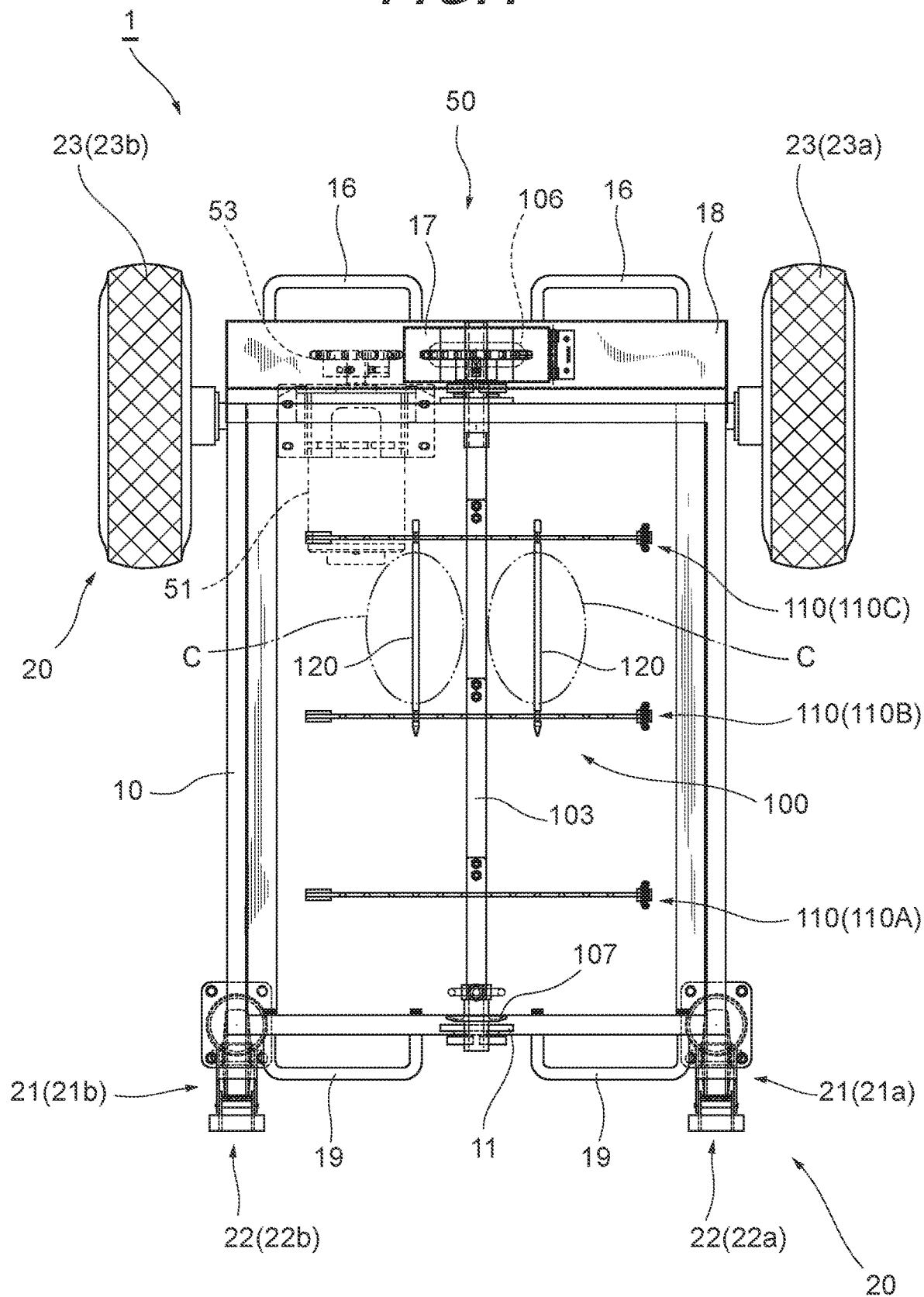
FIG. 4 is a plan view of the automatic rotating grill machine.
Figure 5:
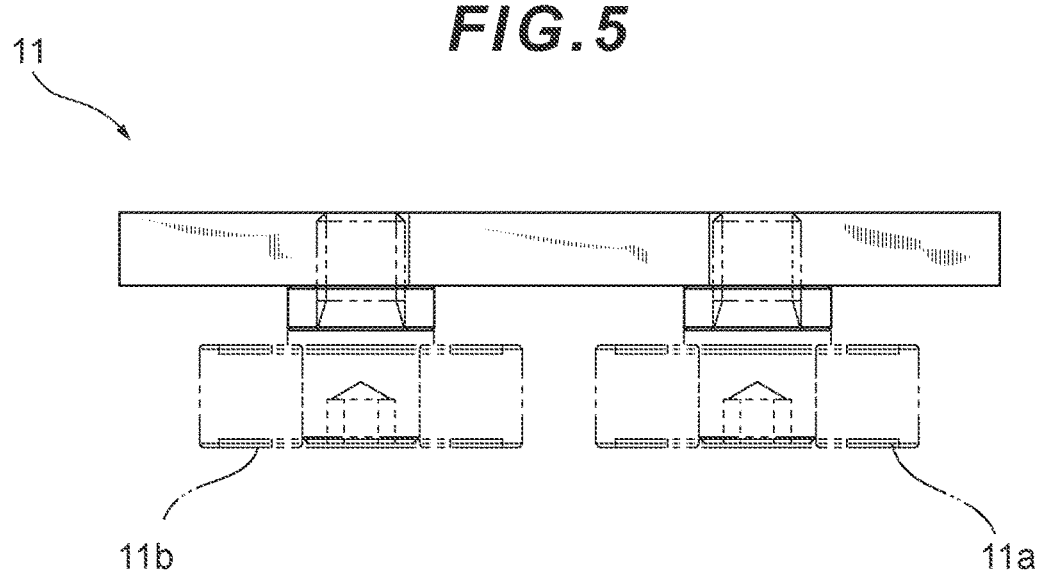
FIG. 5 is a plan view of a bearing member on the front side (forward side)
Figure 6:
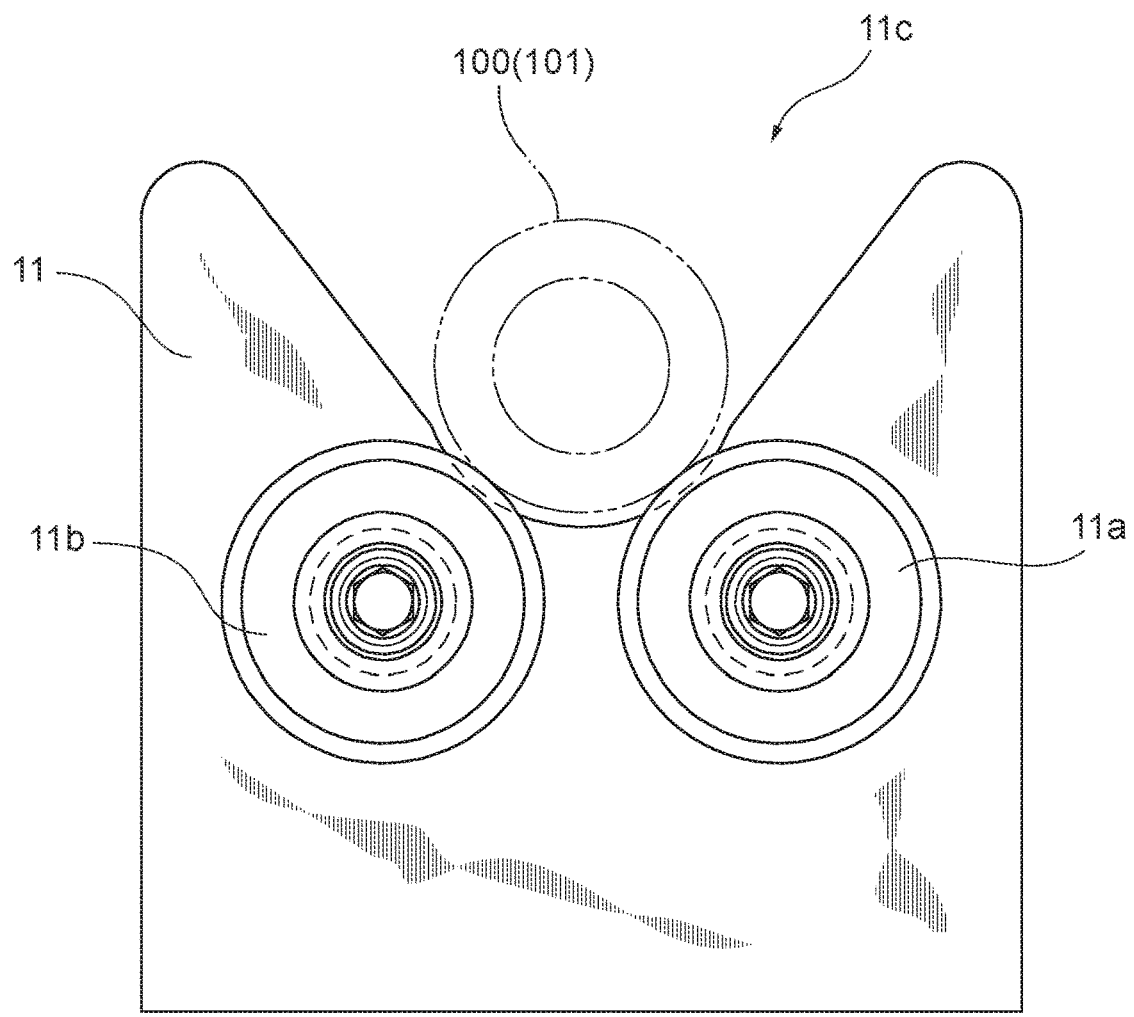
FIG. 6 is a front view of the bearing member on the front side (forward side)
Figure 7:
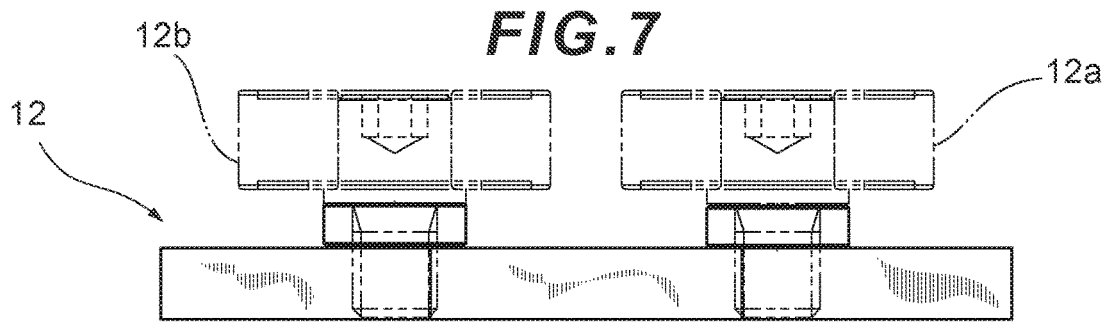
FIG. 7 is a plan view of the bearing member on the rear side (rearward side)
Figure 8:
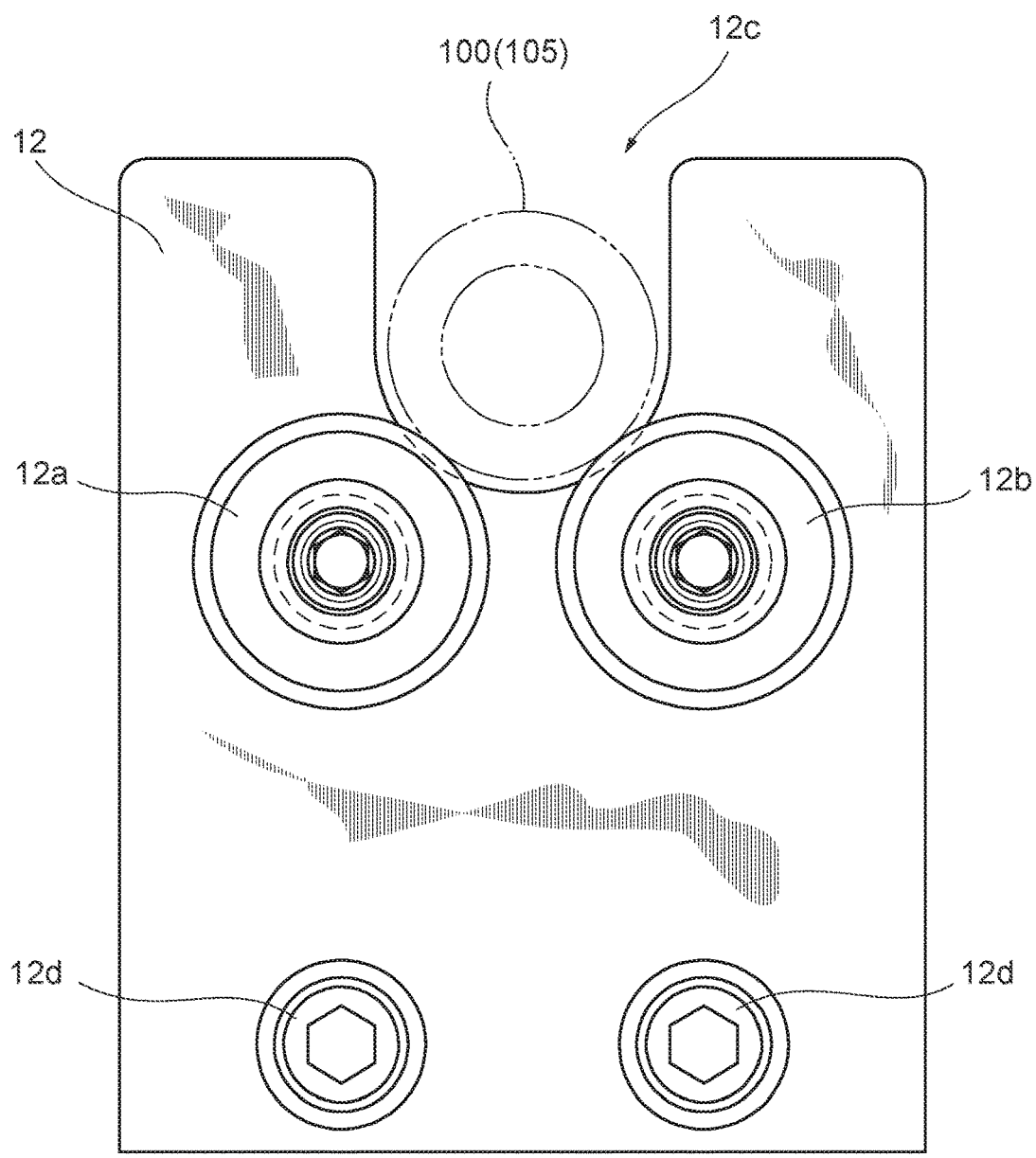
FIG. 8 is a rear view of the bearing member on the rear side (rearward side)

The rotating skewer member 100 automatically rotates in a given cooking position where a food item held by the member can be heated (see for example FIG. 4). The rotating skewer member 100 according to the embodiment includes the shaft portion 101, a crank portion 102, a rod portion (support shaft) 103, a crank portion 104, a shaft portion 105, the sprocket (driving target mechanism) 106, and a skewer holding member 110 (see for example FIGS. 9 and 10).

The shaft portions 101 and 105 are held by the front bearing member 11 and the rear bearing member 12, respectively (see FIGS. 5 to 8). The shaft portions 101 and 105 rotate around the rotation axis 100C (see FIG. 10). The sprocket 106 is provided at the shaft portion 105. The shaft portion 101 is provided with a flange 107 which functions as a stopper to abut against for example the rear surface (inner surface) of the front bearing member 11 and restricts the moving range of the rotating skewer member 100 in the front-rear direction (see for example FIGS. 2 and 10).

Figure 9:
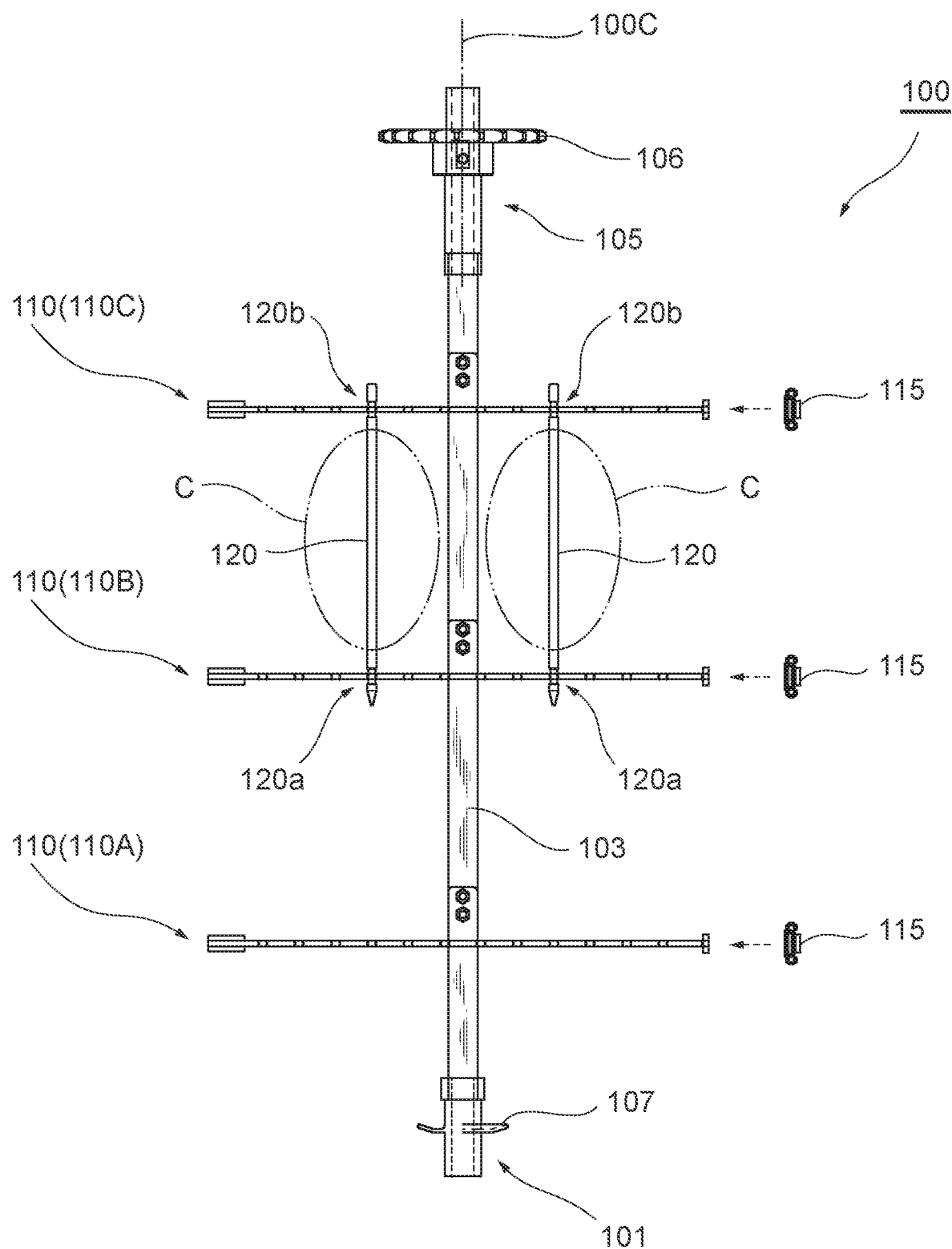
FIG. 9 is a plan view of an exemplary structure of a rotating skewer member.

The rod portion 103 which rotates around the rotation axis 100C while holding the skewer holding member 110 between the shaft portions 101 and 105 (see for example FIGS. 9 and 10). The crank portion 102 is provided between the shaft portion 101 and the rod portion 103, the crank portion 104 is provided between the shaft portion 105 and the rod portion 103, and the rod portion 103 is offset from the rotation axis 100C (see FIG. 10) by the length of the crank portion 102, 104.

The sprocket 106 engages with the chain 54 of the driving force transmission mechanism 52 and is a core element of the mechanism (driving target mechanism) which is driven to rotate by the driving force. The sprocket 106 according to the embodiment is positioned directly above the chain 54 and in engagement with the chain 54 when the rotating skewer member 100 is set to a prescribed cooking position (see for example FIG. 4).

The skewer holding member 110 holds the food item C by holding a cooking skewer 120 inserted through the food item C. According to the embodiment, three skewer holding members 110 (a front skewer holding member 110A, an intermediate skewer holding member 110B, and a rear skewer holding member 110C) configured to extend radially from the rotation axis 100C of the rotating skewer member 100 are provided in the axial direction of the rotation axis 100C (see FIG. 4). The axial interval among the three skewer holding members 110 (in other words, the interval between the front and intermediate skewer holding members 110A and 110B, and the interval between the intermediate and rear skewer holding members 110B and 110C) is shorter than the length of the cooking skewer 120 (see for example FIG. 4).

Although the specific structure of the skewer holding member 110 is not limited, the skewer holding member 110 according to the embodiment is configured as a member which can be opened/closed and includes a skewer mounting portion 111, a skewer pressing portion 112, a pivotal connection portion 113, a skewer groove 114, and a locking device 115 (see for example FIG. 11).

The skewer mounting portion 111 includes a radially extending elongated member fixed to the rod portion 103 for example by welding. According to the embodiment, three skewer mounting portions 111 are provided in the axial direction of the rotation axis 100C (see FIGS. 9 and 10). The skewer mounting portion 111 has a plurality of skewer grooves 114 provided to position the cooking skewers 120 (see FIG. 11). These skewer grooves 114 are provided in the same position in each of the three skewer mounting portions 111, which makes it easy to mount the cooking skewers 120 parallel to the rod portion 103 or to move and position the cooking skewers 120 in the radial direction (in the longitudinal direction of the skewer holding member 110) depending on the size of the food item C.

According to the embodiment, as for the cooking skewer 120, stepped thin shaft portions 120a and 120b are provided near the tip and base ends of the cooking skewer 120, respectively. The size of the skewer groove 114 is larger than the diameter of the stepped thin shaft portions 120a and 120b and smaller than the diameter of the other shaft portions of the cooking skewer 120. In this way, the cooking skewer 120 held between the skewer mounting portion 111 and the skewer pressing portion 112 can be prevented from coming off from the skewer groove 114 (see for example FIG. 9).

In the description of the embodiment, the skewer holding member 110 has the skewer grooves 114 only at the skewer mounting portion 111 by way of example. Alternatively, the skewer grooves 114 may be provided to oppose each other at both the skewer mounting portion 111 and the skewer pressing portion 112, or the skewer grooves 114 may be provided only at the skewer pressing portion 112. Note however that the skewer grooves 114 are preferably provided at the skewer mounting portion 111, since the grooves can serve as provisional temporary positioning means when the cooking skewers 120 are mounted.

The skewer pressing portion 112 is provided movably to open/close with respect to the skewer mounting portion 111 and holds the cooking skewers 120 together with the skewer mounting portion 111. The skewer pressing portion 112 according to the embodiment is made of a plate member pin-connected to the end of the skewer mounting portion 111 through an L-shaped metal fixture 116 and attached pivotably around the connection point (pivotal connection portion 113) to hold a plurality of cooking skewers 120 together (see FIG. 11). Although not specifically shown, a member (such as rubber and a torsion coil spring) which biases in the direction in which the skewer pressing portion 112 opens with respect to the skewer mounting portion 111 may also be provided.

The locking device 115 locks the skewer pressing portion 112 in a closed state and keeps the cooking skewers 120 held between the skewer pressing portion 112 and the skewer mounting portion 111. The locking device 115 may be a snap-type latch referred to as a draw latch ("pacchin latch" or "pachin latch"). Cutouts 111a and 112a for engaging the locking device 115 are provided as appropriate at the ends of the skewer mounting portion 111 and the skewer pressing portion 112, respectively opposite to the pivotal connection portion 113 of (see FIG. 11).

Note that the rotating skewer member 100 is preferably provided with a user-friendly gripping portion. The rotating skewer member 100 according to the embodiment includes a rotating skewer handle (gripping portion) 131 which is detachably provided to the shaft portion 105 and a hand holding ring (gripping portion) 132 that is mounted near directly above the crank portion 102 (see FIG. 2), so that using the gripping portion, the user can more easily remove the rotating skewer member 100 from a cooking position or conversely to set the rotating skewer member 100 to a prescribed cooking position held by the front bearing member 11 and the rear bearing member 12.

The skewer holding member 110 is preferably provided in a well-balanced manner for example axisymmetrically with respect to the rotation axis 100C. In this way, the total weight distribution of the rotating skewer member 100 is less biased and the rotation can be smoother. The skewer holding member 110 according to the embodiment is arranged to be plane-symmetrically with respect to a (vertical) plane including the rotation axis 100C (see for example FIG. 9).

In the rotating skewer member 100 of the rotating skewer grill machine 1 according to the embodiment, the rod portion (support shaft) 103 is offset from the rotation axis 100C since the crank portions 102 and 104 are formed at the rod portion 103, and the center of gravity of the entire rotating skewer member 100 is appropriately lowered (biased). This contributes to improvement in the stability when the rotating skewer member 100 is lifted by gripping the rotating skewer handle 131 and the hand holding ring 132 and the stability when the rotating skewer member 100 is placed in a given position of the rotating skewer grill machine 1, so that the position is more easily stabilized.

The rotating skewer grill machine (automatic rotating grill machine) 1 having the housing 10 equipped with the wheels 20 (including the casters 21 and the tires 23 according to the embodiment) is highly mobile, which allows the machine to be easily adapted to small-scale, more personal applications. The rotating skewer grill machine 1 can provide a new type of leisure time which is casual and yet wilder than ever before regardless of time and place.

Note that the above-described embodiment is one preferable exemplary embodiment of the present disclosure and is not intended to limit the present disclosure, and may be modified in various forms without departing the scope and spirit of the present disclosure. For example, according to the embodiment, the charcoal grate 13 is used as a heating source placement tool to place charcoal as a heating source by way of example. Alternatively, an electric heater may also be used as a heating source or an insulation source, and a heating source placement tool for installing the heater in the housing 10 may be provided. In this case, the electric heater or the tool for installing the electric heater constitutes the heating portion 30.

The present disclosure is preferably applied to an automatic rotating grill machine which cooks a food item that is a cooking target held on a rotating skewer member by heating while rotating the item.

What is claimed is:

1. An automatic rotating grill machine for cooking a food item that is a cooking target held on a rotating skewer member, by heating while rotating the food item, the machine comprising:
    a housing;
    a wheel attached to the housing;
    a heating portion including a heating source provided in the housing or a heating source placement tool on which the heating source is to be placed;
    a driving device which rotates the rotating skewer member in a given cooking position where the food item is capable of being heated by the heating portion; and
    a driving control device configured to supply power to a driving source for the driving device and to control driving,
    the rotating skewer member including a skewer holding member which holds a cooking skewer,
    the skewer holding member being arranged axisymmetrically with respect to a rotation axis of the rotating skewer member or plane-symmetrically with respect to a plane including the rotation axis,
    a support shaft for the rotating skewer member which supports the skewer holding member being arranged in a position offset from the rotation center of the rotating skewer member,
    wherein the skewer holding member is configured to extend radially from the support shaft of the rotating skewer member,
    wherein the skewer holding member comprises a skewer placement portion which is capable of being mounted with the cooking skewer and a skewer pressing portion which presses the cooking skewer mounted on the skewer placement portion and hold the cooking skewer together with the skewer placement portion,
    wherein one or both of the skewer placement portion and the skewer pressing portion have a skewer groove for positioning the cooking skewer,
    wherein one or both of the skewer placement portion and the skewer pressing portion have a plurality of the skewer grooves in a plurality of locations, and
    wherein a plurality of the skewer holding members are provided along an axial direction of the rotation axis, and the skewer grooves are provided in positions of the plurality of skewer holding members equidistant from the rotation axis.

2. The automatic rotating grill machine according to claim 1, wherein the housing is provided with a bearing member including an open groove which allows the rotating skewer member to be attached to and detached from the cooking position.

3. The automatic rotating grill machine according to claim 2, wherein the driving device comprises a driving force transmission mechanism which is driven by the driving source, and the rotating skewer member comprises a driving target mechanism which engages with the driving force transmission mechanism in the cooking position.

4. The automatic rotating grill machine according to claim 3, wherein the rotating skewer member comprises a gripping portion which is available to a user when the rotating skewer member is attached to or detached from the cooking position.

5. The automatic rotating grill machine according to claim 1, wherein the skewer pressing portion is pin-connected to a connection point of the skewer placement portion and is capable of being opened and closed around the connection point.

6. The automatic rotating grill machine according to claim 5, wherein the skewer holding members further comprise a locking device which keeps the skewer placement portion and the skewer pressing portion holding the cooking skewer.

7. The automatic rotating grill machine according to claim 1, wherein wheels having different sizes in an advancing direction of the automatic rotating grill machine are attached as the wheel.

8. The automatic rotating grill machine according to claim 7, further comprising a handle attached to the housing.

* * * * *